Patented Mar. 16, 1954

2,672,469

UNITED STATES PATENT OFFICE 2,672,469

STEROID AMINES AND PROCESS FOR MANUFACTURING SAME

Arpad Berczeller, New York, N. Y.

No Drawing. Application July 3, 1950,
Serial No. 172,026

2 Claims. (Cl. 260—397.5)

My invention relates to the manufacture of steroid amines and to intermediates obtained in the course of such manufacture.

The steroid amines of the present invention are characterized by an amino group attached to the 17-carbon, either directly or by way of a hydrocarbon group. The invention relates particularly to the 17-amines obtainable from various naturally occurring and synthetically produced steroids, and especially those having a multi-carbon chain attached to the 17-carbon, such as the steroid 17-acids and of the various 17-degradation products of such steroids.

It is a general object of the present invention to provide steroid amines possessing valuable therapeutic properties or capable of conversion into compounds of therapeutic value.

It is also an object of the invention to provide 17-steroid aldehydes which themselves possess therapeutic activity or can be converted into other steroid compounds, such as the corresponding amines, having therapeutic value.

I have found that 17-steroid amines have unexpected therapeutic activity in the form of a strong antimicrobial action while being at the same time of relatively low toxicity, and that such activity is shared also by the 17-steroid aldehydes which are obtainable in the course of preparation of the amines.

In the production of the steroid amines of the present invention from the steroid acids there may or may not simultaneously occur a degradation of the 17-acid group by one carbon atom. Thus, as will be explained more fully hereinbelow, cholic acid can be converted either to the corresponding cholanamine or to the nor-cholanamine. Similarly nor-cholanic acid can be converted either to nor-cholanamine or to bisnor-cholanamine.

For the purposes of the present invention it is necessary only that there be a carboxyl group attached to the 17-carbon, either directly or by way of a hydrocarbon group. The steroid nucleus may otherwise be substituted by hydroxyl, acyloxy, alkoxy, keto or other groups. Where the starting compound has nuclearly attached substituents which would be attacked in the course of the desired operations on the 17-group various known measures may be resorted to to prevent such undesired side reactions. Thus in the case of nuclearly attached hydroxyl groups, these may be protected in known manner by acylation or alkylation and thereby converted into groups which can subsequently be re-converted into hydroxyl with the aid of hydrolysis. Similarly, when the starting steroid compound has one or more keto groups attached to the nucleus, then in the procedure described hereinbelow involving hydrogenation, either a method of hydrogenation is selected which will not reduce such keto groups, or such keto groups may be protected by reaction with various ketone reagents, such as semicarbazide, thio-semicarbazide, or the like. While acetylation of hydroxyl groups is a procedure usually employed for the protection of such groups, I have found formylation to be preferable in many cases, especially in the case of the bile acids.

The production of the amine compounds of the present invention is effected by first converting the steroid acid into the corresponding acid halide. From this point, alternative procedures may be followed depending upon whether it is desired to degrade the side chain or not. Where degradation is to take place, the acid chloride can be first converted into the azide by treatment with, for example, an alkali metal azide. By decomposition and isomerization the isocyanate is formed. Hydrolysis of the latter in the presence of aqueous acid results in partial decomposition with loss of carbon dioxide and the formation of the 17-amine with loss of one carbon from the side chain. On the other hand, where the original number of carbon atoms is to be preserved, the acid chloride can be reduced with hydrogen in the presence of a catalyst to the corresponding alcohol, the aldehyde being intermediately formed. Treatment of the alcohol with a halogenating agent, such as thionyl chloride or phosphorous oxychloride, results in the formation of a corresponding halide, which by treatment in known manner with ammonia or alkali metal amides, yields the amine.

As already indicated, the aldehydes can be produced in the course of manufacture of the amines, as by effecting reduction of the acid halide with just sufficient hydrogen to convert the acid halide group to the aldehyde group. The aldehyde can be removed from the reaction product by a fractional crystallization, or by other known procedures, as by conversion to the semicarbazone, thio-semicarbazone, hydrazone, etc., followed by crystallization, separation and hydrolysis to restore the aldehyde group.

The process of the present invention is applicable to steroid acids generally, but the bile acids and their 17-degradation products are more generally preferred. Among these acids are the various cholanic and cholenic acids and their nuclear substitution products, including cholanic and cholenic acids themselves and their nor-, bisnor- and etio-cholanic and cholenic acids, cholic, desoxycholic, dehydrocholic, hydrodesoxycholic, lithocholic, chenodesoxycholic and other bile and related steroid acids and their 17-degradation products. The antimicrobial action of my new compounds appears to be due to the presence of the primary amine group and it appears to be unaffected by the usual substituents of the steroid nucleus.

The amines may be employed topically, or they may be administered orally or by intramuscular or subcutaneous injection. For such use they are mixed with a vehicle, such as water or a fatty oil, or they may be put up in tablets with the aid of a starch or other vehicle or binder. For parenteral administration a daily dose can be from 250 to 500 mg. and larger; while the peroral dose, as in the form of a tablet, can be 2 g. per day or more. A convenient form of administering the amines is in the form of their acid salts, like the hydrochloride and sulfate, or as salts of organic acids, like the penicillinate (a salt formed by reacting the amine with free penicillin), acetate, etc., which can readily be produced by mixing combining proportions of the amine and acid. These salts have a greater solubility in water than the amines themselves, but they may be injected in the form of an oil suspension for a longer-lasting action. The amines themselves are generally soluble in vegetable oils and can be injected as a solution in such oils.

The invention will be illustrated in greater detail with the aid of the following examples which are presented for the purposes of illustration only and not as indicating the scope of the invention.

EXAMPLE 1

Preparation of (3,7,12)-trihydroxy nor-cholan amine

Triformyl cholic acid was prepared in known manner from cholic acid and then transformed into triformyl cholyl chloride (method of Cortese & Baumann).

2.7 grams of sodium azide were dissolved in 8 cc. distilled water. To the well-stirred solution, 10 grams of the freshly prepared triformyl cholylchloride, dissolved in 10 cc. of acetone, were added and stirred in vigorously. The mixture was cooled in an ice bath, the temperature being kept below 10° C. After one hour the stirring was stopped and the reaction product allowed to remain at room temperature. A brownish viscous solution separated as the upper layer from the slightly pink-colored watery lower layer. The watery lower layer was carefully removed by suction with a pipette.

The upper layer contained the triformyl cholyl azide reaction product. Twenty five cc. of benzol were warmed to 60° C. and the viscous solution containing the triformyl bile acid azide was added thereto. There was considerable bubble formation and escape of gas (nitrogen). The reaction solution was kept first at 65° C., then at 75° C., altogether for one hour. The triformyl cholyl azide was thus transformed into triformyl cholylisocyanate. A little insoluble material collected on the bottom of the reaction flask in certain runs and this was filtered off. The solution was warmed again and 10 cc. concentrated HCl were added. There was escape of $CO_2$, and after a short time of warming the supernatant brownish benzol solution became gradually decolorized and at the same time the HCl in the bottom of the flask became turbid, brownish and finally there was a collection of an oily brownish mass. The isocyanate had been hydrolyzed to the amine. The viscous material was collected, washed with a little water and dissolved in 150 cc. of alcohol. N/NaOH was added until turbidity appeared. The solution was boiled until the alcohol evaporated. A yellow-brownish viscous oil separated which hardened upon cooling.

The product was soluble in alcohol, acetone, ether, propylene glycol; it was insoluble in aqueous alkali, and almost insoluble in water. Precipitated from an alcoholic solution by addition of NaOH solution, it can be redissolved after acidifying with HCl or other acid and warming.

BIOLOGICAL TESTS

Toxicity.—Mice (20 grams weight) tolerated 50 mg. given orally in a single dose. They also tolerated 50 mg. in cottonseed oil (partly dissolved, partly emulsified) administered by subcutaneous injection.

Anti-bacterial action against staphylococci (gram-positive organism), typhoid bacilli, and colon bacilli (gram-negative organisms).—10 mg. of trihydroxy nor-cholamine were dissolved in 2 cc. of 95% ethyl-alcohol. To tubes containing 10 cc. nutrient broth was added 0.1 cc. or 0.05 cc. of the alcoholic drug solution. To control tubes 0.2 cc. of pure 95% ethyl alcohol was added. All tubes were seeded with 0.1 cc. of a 24-hour growth of hemolytic Staphylococcus aureus in broth.

Result.—After 24 hours, 4 plus growth in the control tubes. No growth in tubes containing 5 mg. per cent and 2.5 mg. per cent of the drug, respectively. There was no growth in these tubes even after 2 weeks' observation.

In an identical experimental set-up, the activity of the drug was tested against typhoid bacilli (Escherichia typhosa strain H 901, Dept. of Health, New York city) and Bacillus coli freshly isolated from stool. Complete growth inhibition was obtained with drug concentrations of 5–10 mg. per cent.

It may be pointed out that in these experiments, and likewise in the following, the seed of microorganisms was very heavy.

Activity against tubercle bacilli (acid-fast organism).—To flasks containing each 50 cc. of Proskauer-Beck's medium, alcoholic drug solution was added in the amount of 0.1 cc., 0.2 cc. and 0.5 cc., respectively, and thus drug concentrations of 1 mg. per cent, 2 mg. per cent and 5 mg. per cent obtained. To control flasks, 1 cc. of pure 95% ethyl alcohol was added. All flasks were seeded with a pellicle fragment measuring about 1 cm.$^2$ taken from a growth of virulent human tubercle bacilli in Proskauer-Beck's medium. After three weeks' observation, the medium in the control flasks was completely covered with a tubercle bacilli pellicle. There was no growth in the flasks containing 5 mg. per cent and 2 mg. per cent of the drug, and in the flask containing 1 mg. per cent of the drug there was only a slight thickening of the seed. After 8 weeks no growth occurred in the 2 mg. per cent and 5 mg. per cent flasks, and only slight growth in the 1 mg. per cent flasks. After 3 months' observation, there was still no growth in the 2 mg. per cent and 5 mg. per cent flasks and only slight growth in the 1 mg. per cent flasks. There was thus complete growth inhibition by 2 mg. per cent and partial but very marked inhibition by 1 mg. per cent concentration of the drug.

EXAMPLE 2

Preparation of 3,7,12-trihydroxycholamine (1) 3,7,12-TRIFORMYL CHOLANE 24-CHLORIDE Triformyl cholic acid was prepared from cholic acid and transformed into triformylcholylchloride (Cortese and Baumann).

3,7,12-Triformyl-24-hydroxy cholane was prepared by catalytic hydrogenation of triformylcholylchloride. By bubbling a stream of hydrogen through a hot solution of triformylcholylchloride in xylene in the presence of palladium-BaSO4 catalyst, triformylcholic aldehyde was obtained and then reduced further to the corresponding alcohol (Rosenmund reaction).

5 grams of 3,7,12-triformyl-24-hydroxycholane were placed in a dish and 5 cc. of thionyl chloride added. The reaction mixture was evaporated in the desiccator over fused calcium chloride by gentle suction with the water pump for three hours. The gummy residue was washed and rubbed with petroleum ether, whereupon a brownish amorphous solid was obtained.

(2) 3,7,12-TRIHYDROXYCHOLAMINE

Three grams of freshly prepared 3,7,12-triformylcholanic 24-chloride were stirred with a large excess of concentrated ammonia for thirty minutes. The product was filtered and washed well with water. It was suspended in 100 cc. of alcohol, warmed first and then cooled. The bulk of the material stayed in solution. The insoluble residue was removed by filtration. To the alcoholic solution N/NaOH was added until turbidity appeared. It was then boiled until the alcohol had evaporated. A yellow-brownish, viscous oil separated which hardened on cooling.

It is insoluble in aqueous alkali, almost insoluble in water. It is soluble in alcohol, acetone and propylene glycol. Precipitated from an alcoholic solution by addition of NaOH solution, it can be redissolved by acidifying with HCl or other acid and warming.

The following equations illustrate the reactions involved:

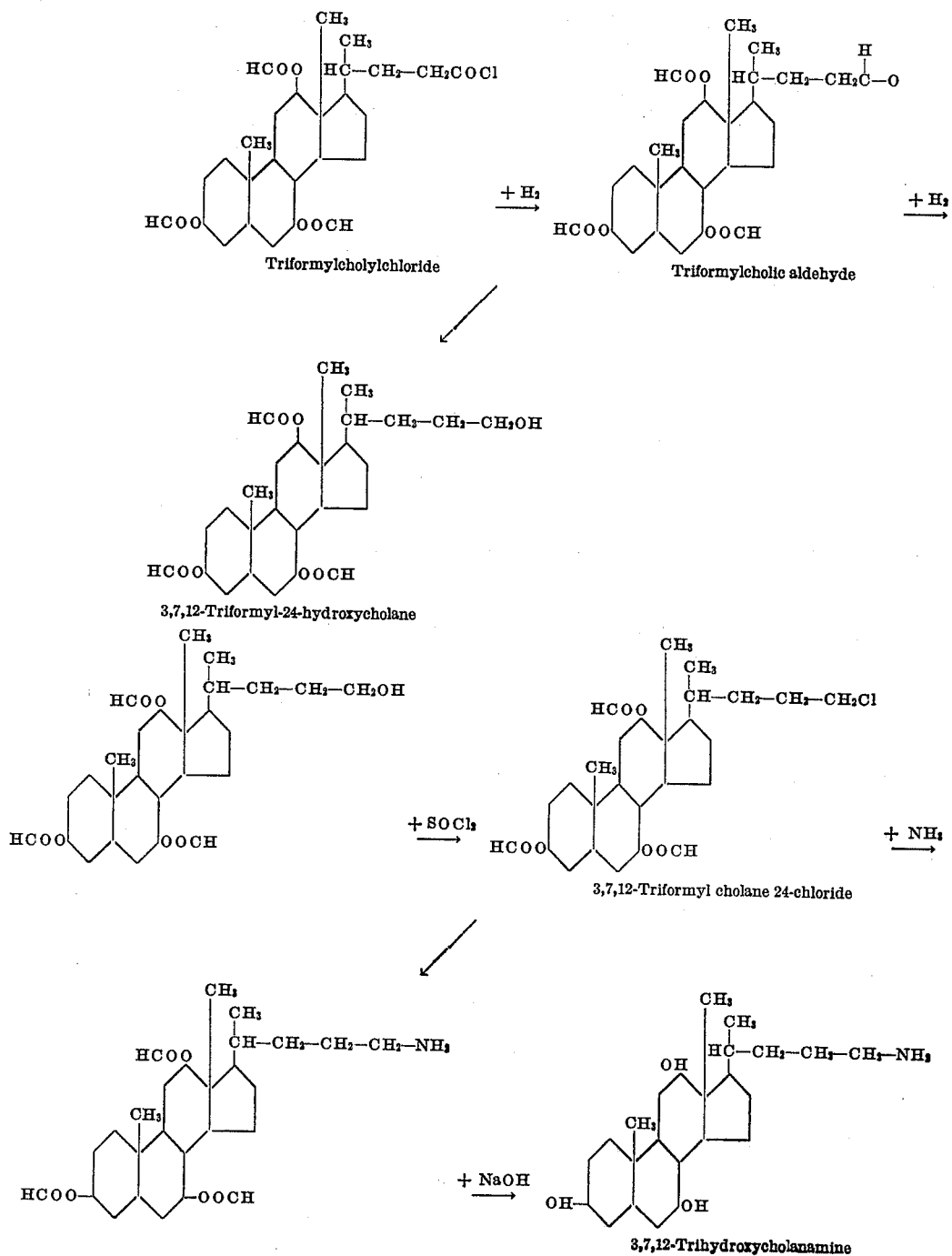

I claim:
1. Process for the manufacture of nor-cholylamine which comprises converting cholic acid into the 3,7,12-triformyl compound, reacting the same with a chlorinating agent to produce the acid chloride, reacting the latter with sodium azide, heating the acid azide so formed to convert the same into the isocyanate, reacting the latter with strong hydrochloric acid to form the amine, and hydrolyzing the acyloxy groups to restore the hydroxyl groups.

2. A 3,7,12-trihydroxy nor-cholanamine, possessing high anti-microbial activity and prepared by the process of claim 1.

ARPAD BERCZELLER.

References Cited in the file of this patent

UNITED STATES PATENTS

| Number | Name | Date |
|---|---|---|
| 2,108,646 | Bockmuhl | Feb. 15, 1938 |
| 2,188,870 | Bockmuhl | Jan. 30, 1940 |
| 2,188,914 | Miescher | Feb. 6, 1940 |
| 2,276,543 | Miescher | Mar. 17, 1942 |
| 2,337,271 | Reichstein | Dec. 21, 1943 |
| 2,352,568 | Reichstein | June 27, 1944 |

OTHER REFERENCES

Caldwell: Jour. Am. Chem. Soc., 60, 991–993 (1938).

James: Jour. Chem. Soc., London, 1946, 665–670.

Heyl: Jour. Am. Chem. Soc., 69, 1957–1961 (1947).